W. H. WIESTER.
Egg-Beater.
No. 209,205. Patented Oct. 22, 1878.
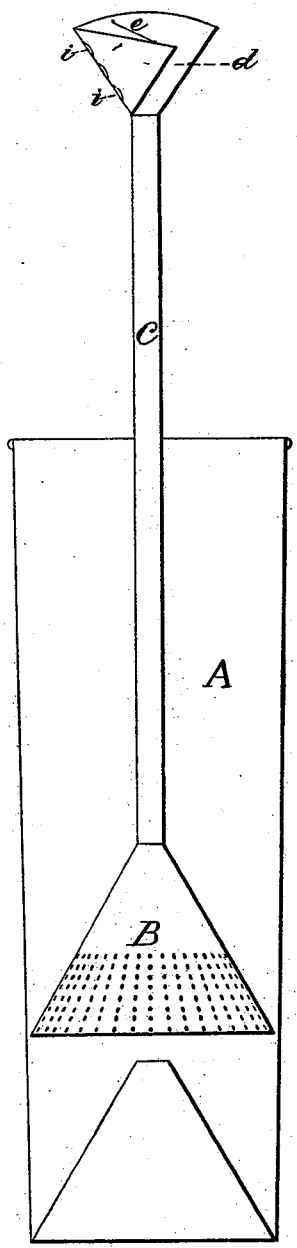
Witnesses
D. B. Lawler.
I. Saxon Taylor
Inventor
William H. Wiester
per Jno. L. Boone
Attorney

UNITED STATES PATENT OFFICE.

WILLIAM H. WIESTER, OF SAN FRANCISCO, CALIFORNIA.

IMPROVEMENT IN EGG-BEATERS.

Specification forming part of Letters Patent No. 209,205, dated October 22, 1878; application filed July 11, 1878.

*To all whom it may concern:*

Be it known that I, WILLIAM H. WIESTER, of the city and county of San Francisco, in the State of California, have invented an Improvement in Apparatus for Aerating and Mixing Substances; and I do hereby declare that the following is a full, clear, and exact description thereof, reference being had to the accompanying drawings, forming a part of this specification.

My invention relates to an improvement upon the apparatus for aerating and mixing substances described and claimed in the Letters Patent No. 59,449, which was issued to E. L. Pratt on the 6th day of November, 1866.

In Pratt's device the concavity of the plunger alone is depended upon for conveying air into the body of the material to be mixed and aerated, but I have discovered that by combining a hollow plunger-rod and valve with the concave perforated plunger or dasher, so as to force air into the concavity of the plunger at every stroke, I can greatly increase the efficiency of the device.

In the accompanying drawing the figure represents a transverse section of the vessel and plunger.

Let A represent the open-top vessel into which the substances to be aerated and mixed are placed. B is the concave plunger or dasher, which, in the present instance, is represented as a hollow cone or inverted funnel. This plunger has numerous perforations around its lower edge, which extend nearly half-way from the bottom to the top, leaving an imperforate apex or cavity above the perforations in which the air is contained when the plunger descends, so that the force of the downward stroke will expel the substance which enters the bottom of the plunger, together with the contained air, out through the perforations, thus thoroughly mixing and aerating the substance.

Heretofore the only means for admitting air into the concave dasher was through the perforations, and this could only occur when the plunger was lifted sufficiently above the substance in the vessel to expose the perforations, which, owing to its peculiar shape, is seldom the case, so that the only office performed by the plunger was to mix the substance.

My improvement consists in the employment of a tubular handle, C, which connects with the apex or upper part of the hollow cone or concave plunger B. To the upper end of this handle I attach either a downward or upward opening valve, *e*, which opens and admits air into the hollow handle and plunger when the plunger is raised, whether it be raised out of the substance or not, and closes, so as to prevent the return of the air when the dasher or plunger is forced down, thus providing a positive supply of air at each stroke.

For protecting the valve I have made a hollow box, *d*, at the top of the handle, in which holes *i i* are made, through which to admit the air, and the partition in which the valve is mounted I have placed at an angle, as represented, but these parts may be variously arranged.

I am aware that a hollow handle has long been used in connection with dashers and plungers for admitting air into the substance to be mixed and aerated.

I am also aware that a valve has been used for preventing the return of the air. These, therefore, I do not claim broadly; but What I do claim, and desire to secure by Letters Patent, is—

In a device or apparatus for aerating and mixing substances, the combination, with the open-top vessel A, of the inverted funnel-shaped or hollow conical plunger B, having perforations around its lower edge, and extending nearly half-way from the bottom to the top thereof, and provided with a tubular handle, C, and valve *e* at its upper end, substantially as and for the purpose set forth.

In witness whereof I have hereunto set my hand and seal.

W. H. WIESTER. [L. S.]

Witnesses:
 CHARLES D. COLE,
 J. H. BLOOD.